United States Patent [19]

Kotani et al.

[11] 4,315,371
[45] Feb. 16, 1982

[54] PRESET BRAKE DEVICE FOR LINE DRAWING MACHINE, DRAFTING MACHINE OR LIKE

[75] Inventors: Sadahiko Kotani, Fujimi; Yoshitaka Gibu, Nakaitabashi, both of Japan

[73] Assignee: Asahi Seimitsu Kabushiki Kaisha, Tokyo, Japan

[21] Appl. No.: 111,201

[22] Filed: Jan. 11, 1980

[30] Foreign Application Priority Data

Jan. 12, 1979 [JP] Japan .................................... 54-2533

[51] Int. Cl.³ .......................... B25H 7/04; G01B 5/14
[52] U.S. Cl. ................................... 33/1 M; 33/32 C; 33/125 C; 33/174 PC
[58] Field of Search .................... 3/1 M, 174 PC, 132, 3/125 C, 125 R, 166, 18 R, 32 R, 32 C; 188/110

[56] References Cited
U.S. PATENT DOCUMENTS 2,785,710  3/1957  Mowery .............................. 188/110
3,165,017  1/1965  Galabert ........................... 33/125 C
4,233,749  11/1980  Coulter et al. ................. 33/174 PC Primary Examiner—William D. Martin, Jr.
Attorney, Agent, or Firm—Birch, Stewart, Kolasch and Birch

[57] ABSTRACT

A preset brake device is disclosed for use with line drawing machines, drafting machines, and the like. A preset input station is disposed on a guide rail of the drafting machine, etc. A movable body on the guide rail holds a line drawing instrument. A preset distance is entered into the preset input station, the preset distance representing a desired distance of movement of the movable body along the guide rail. As the movable body is moved along the guide rail, when the distance traveled by the movable body equals the preset distance, an electro-magnetic brake automatically arrests the movement of the movable body along the guide rail. Two displays are included. One display on the preset input station displays the preset distance. The second display will display the distance traveled by the movable body along the guide rail.

9 Claims, 4 Drawing Figures

PRESET BRAKE DEVICE FOR LINE DRAWING MACHINE, DRAFTING MACHINE OR LIKE

BACKGROUND OF THE INVENTION

1. Field of the Invention

The present invention relates to a preset brake device for a line drawing machine, a drafting machine or the like.

2. Description of the Prior Art

In the prior art involving line drawing machines, drafting machines, or the like, it has been known that the movable body carrying the line drawing instrument or the scale is mounted on a guide rail so as to be movably guided therealong and lines are drawn after a desired amount of movement takes place, the amount of movement capable of being read from the graduations carried on the scale. Then, the movable body may be moved and positioned in accordance with the reading from the graduations. This operation involving positioning the guide rail and reading from the graduations have made drawing in general, and, particularly, drawing a plurality of lines at regular intervals extremely inefficient.

SUMMARY OF THE INVENTION

It is a primary object of the present invention to provide a preset brake device for a line drawing machine, a drafting machine or the like, in which, it is possible to input a desired amount of movement into a preset input station such that, merely by moving the guide rail of the line drawing instrument or the scale, after the desired amount of movement has previously been input into a preset input station, a brake assembly will be automatically activated which will arrest the guide rail of the line drawing instrument or scale at the preset position without the need to position the guide rail simultaneously with the reading of the graduations as was necessary in the prior art.

Although various arrangements (such as those of the key input type as often employed in the well known portable electronic calculator, of the thumb wheel switch type and the dial type) may be used as the preset input station into which the desired amount of movement may be previously input, this input station must be provided with an input display so that the input amount may be digitally displayed and the preset amount of movement may be visually determined. A detector, adapted to detect a movement amount of the movable body with respect to the guide rail, is necessary in order that the line drawing instrument or the scale may be automatically arrested at the preset position. As such, additional means are needed which will directly detect the movement of the movable body relative to the guide rail. Detection via mechanical transmission may be used. However, interposition of the mechanical transmission would create problems involving reduced precision as a result of this mechanical transmission. For the detector, means for analog detection, such as a potentiometer, as well as means for digital detection relying upon an encoder may be used. Use of the former, however, would create problems concerning the contact area and the need for an A-D converter. Accordingly, the movement amount detector should preferably include a linear scale stationarily mounted on the guide rail and a photoelectric detector mounted on the movable body because of its durability, precision, the prevention of erroneous detection and the resultant simplification of construction. The amount of movement detected by the movement detector is preferably counted by an up-down counter, the counter signals being digitally displayed for visual determination. To determine the remaining amount of movement, the actual amount of movement may be counted down from the preset amount of movement previously input in the up-down counter. The display, adapted to display the actual amount of movement detected by the movement detector, constitutes, together with the input display (adapted to display the preset amount of movement) a comparative display station. This comparative display station serves to compare the preset amount of movement previously input thereinto with the actually detected amount of movement to generate a coincidence signal when a coincidence occurs between the preset amount and the actually detected amount, such that the coincidence signal activates an electromagnetic brake assembly to arrest the movable body relative to the guide rail and thereby to position the line drawing instrument or the scale automatically at the preset position. Obviously, this electromagnetic brake assembly also may be arranged so that said assembly is stationarily mounted on the guide rail and indirectly arrests the movable body via the mechanical transmission. However, for purposes of reliably maintaining the arrested state and of simplifying the construction, the assembly should preferably be mounted on the movable body in a stationary manner, with a brake shoe adapted to be directly urged against the guide rail. Furthermore, a switch for deenergization of the electromagnetic brake assembly should be used with a reset switch for the preset input display so that the preset value is displayed again, by the input display, in synchronization with the deenergization of the electromagnetic brake assembly. This is extremely advantageous, particularly for drawing a plurality of lines at regular intervals. It is preferred that the preset input station include a mode change-over switch for changing modes, between a preset mode and a movement amount display mode, the preset mode causing the presetting and the movement amount display mode causing the comparative display station to display the movement amount of the movable body. In this way, in operating the line drawing machine, the drafting machine or the like it is not necessary to read from the graduations to position the guide rail of the line drawing machine. In such case, the electromagnetic brake assembly may be arranged so as to be operated by a manual switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
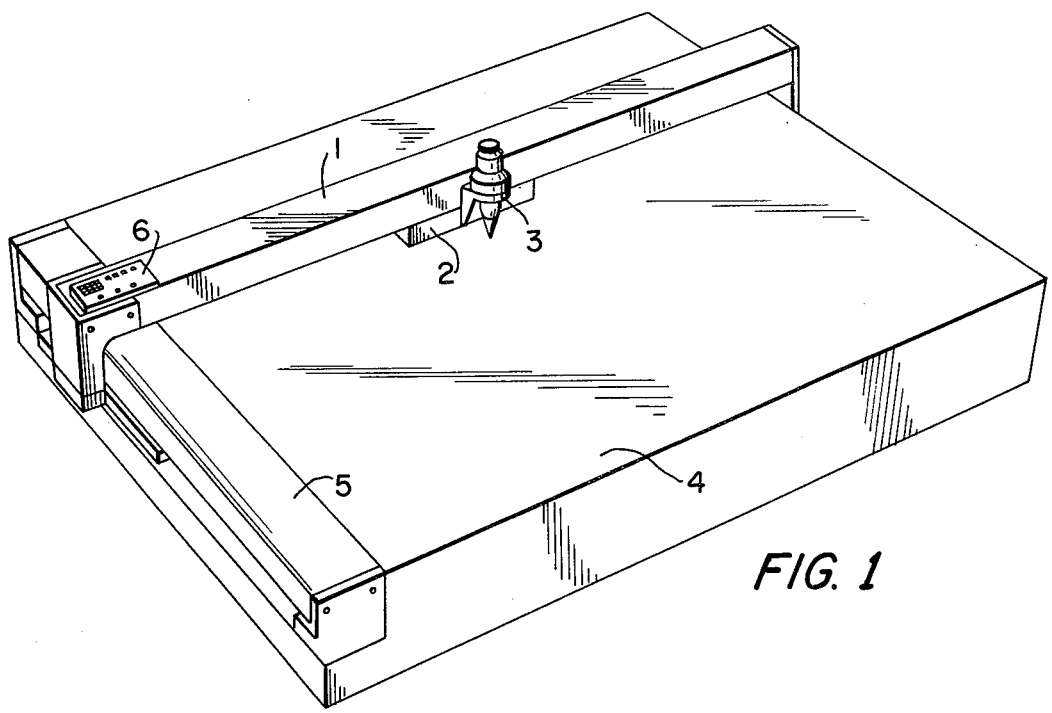
FIG. 1 is a perspective view showing a preferred embodiment of the device according to the present invention.
Figure 2:
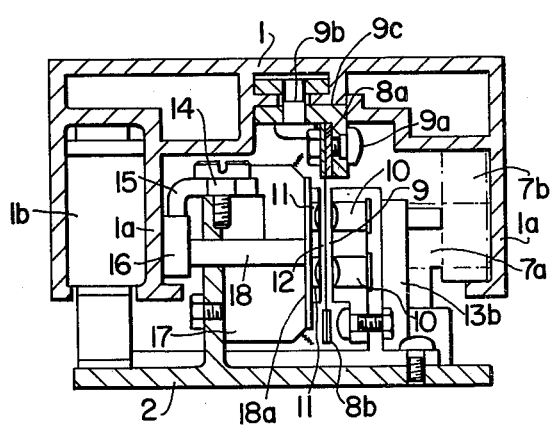
FIG. 2 is a side view showing an important part thereof partially in section.
Figure 3:
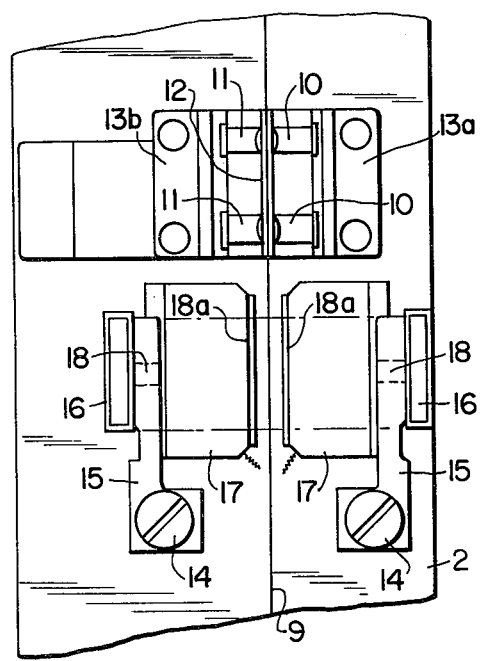
FIG. 3 is a plan view showing the preferred embodiment with the important part of FIG. 2 partially omitted.

Referring to FIGS. 1 to 3, a line drawing machine is illustrated. A guide rail 1 is adapted to movably guide a movable body 2 along the underside thereof, integrally supporting a line drawing instrument 3 on a base plate 4. The guide rail 1 can also be laterally guided along another guide rail 5 which is arranged transversely of said first-mentioned guide rail 1 and stationarily mounted, at opposite ends, to the base plate 4. Reference numeral 6 designates a control panel mounted on the upper side of the guide rail 1, carrying thereon input keys of a preset input station, an input display station, a comparative display station, a source switch, a mode change-over switch, a reset switch, a manual brake switch and other components in a suitable manner. The guide rail 1 includes, as shown in FIG. 2, a pair of longitudinally extending and parallel rail frame portions 1a so that a horizontal roller 7a and a vertical roller 7b both are rotatably supported on the movably body 2 and are maintained in contact with the respective rail frame portions 1a thereby movable supporting the body 2 along the guide rail 1. There is a linear scale 9 extending longitudinally of the guide rail 1 and supported at vertically opposite ends by supporting members 8a, 8b, respectively. With the embodiment shown, the supporting member 8a is secured by set screws 9a, 9b and an L-shaped frame 9a to the guide rail 1. On the upper side of the movable body 2, a light emitting diode 10 is oppositely disposed relative to a light receiving diode 11. Interposed therebetween is a linear scale 9 and an index scale 12, the index scale 12 being movable in adjacency relative to the linear scale 9 at the side of the light receiving diode 11 so that the linear scale 9, the light emitting diode 10, the light receiving diode 11 and the index scale 12 together constitute a detector station adapted to detect an amount by which the movable body 2 has been moved relative to the guide rail 1. Reference numerals 13a, 13b designate members adapted to support the light emitting diode 10, the light receiving diode 11 and the index scale 12 and to secure them to the movable body 2, respectively. The movable body 2 additionally carries a pair of brake members 15, each pivotally supported on respective pivots 14 and provided at the front end with a brake shoe 16 opposed to the associated rail frame portion 1a of the guide rail 1. There is also provided a pair of solenoids 17 arranged side by side and each including a push bar 18 opposed to the inner side of each of the brake shoes 16 so that energization of the respective solenoids 17 cause the respective push bars 18 to urge the respective brake shoes 16 against the associated rail frame portions 1a. In the case of the embodiment illustrated, each of the push bars 18, having at the end thereof and being remote from the associated brake shoe 16, an integrally connected reactive plate 18a so that, when the pair of solenoids are energized, these reactive plates 18a are given a common polarity producing a mutually rective force serving to increase the force with which the push bars 18 urge the respective brake shoes 16 against the associated rail frame portions 1a. Thus, the brake members 15 constitute, together with the solenoids 17, an electromagnetic brake assembly adapted to arrest the movable body 2 relative to the guide rail 1. In addition, the guide rail 1 has a cable box 1b mounted thereon to accommodate a cable by which an electric connection is established between the control panel 6, the detector station and the electromagnetic brake assembly, the latter two being mounted on the movable body 2.

Figure 4:
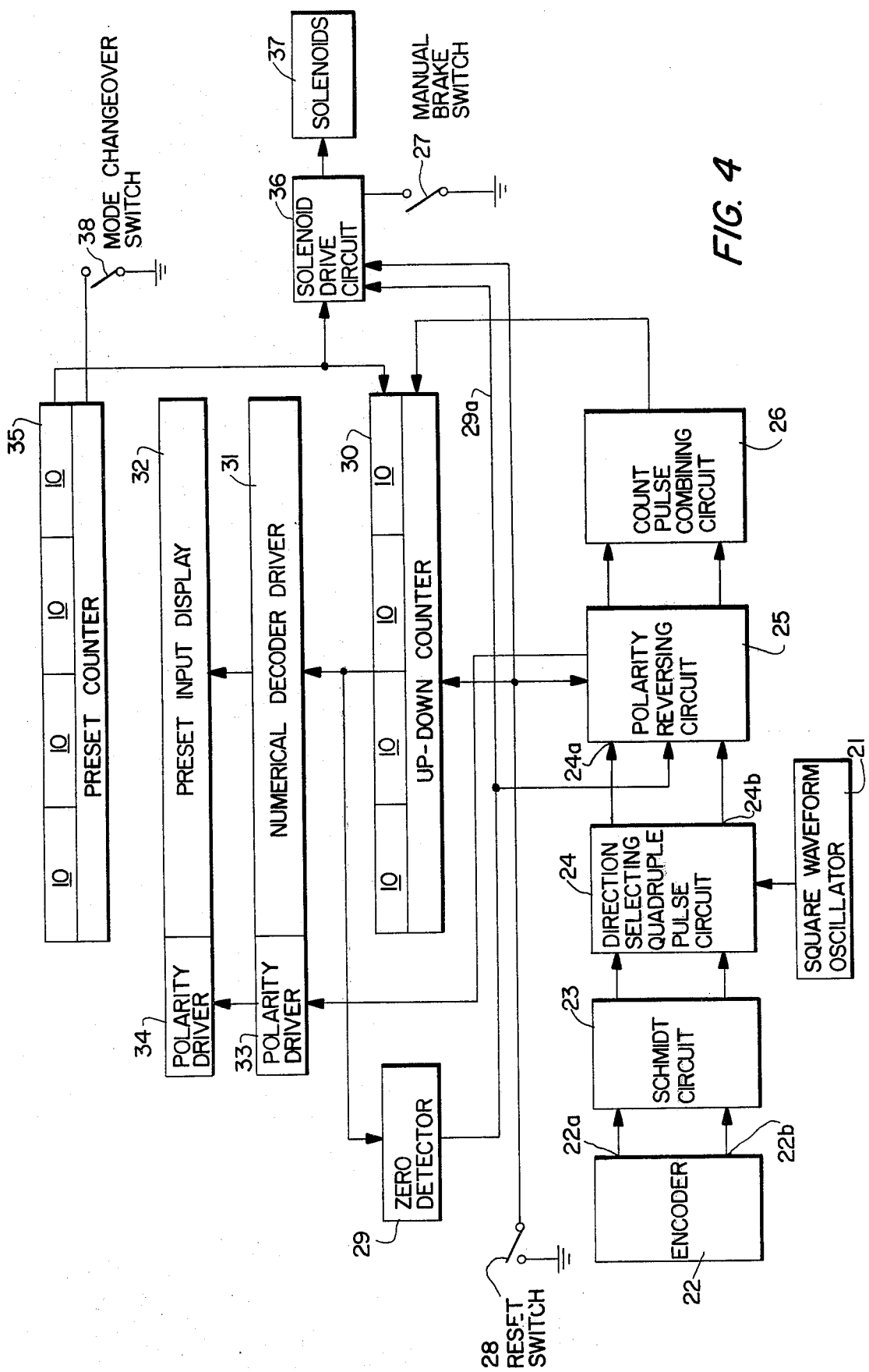
FIG. 4 is a block diagram illustrating the electric circuitry incorporated therein.

The present invention will be described in more detail with reference to a block diagram of FIG. 4. Reference numeral 35 designates a preset counter into which a numerical value of four decimal digits can be input as a digital amount. This preset counter 35 corresponds to the preset input station according to the present invention, since the numerical value previously input at the input station, representing a predetermined amount of movement, is directly input into this counter. With a mode change-over switch 38 being opened, i.e., in the preset mode, count signals corresponding to the numerical value in the preset counter 35, are transferred into a up-down counter 30 and thereby a numerical decoder driver 31 is activated, causing a numerical display station 32 to display the amount of movement, expressed in a four decimal digit form. Accordingly, the numerical display constitutes the input display station according to the present invention. When the movable body 2 is moved along the guide rail 1, an encoder 22 comprising the linear scale 9, the light emitting diode 10, the light receiving diode 11 and the index scale 12 serves as the movement detector station and, in the embodiment shown, detects the amount of movement in the form of digital signals. Upon detection, the encoder 22 provides a sin-waveform output 22a and a cos-waveform output 22b, out-of-phase from each other by 90°, depending on the direction of movement, which are, in turn, shaped by a Schmidt circuit 23 and then applied to a direction selecting quadruple pulse circuit 24 which receives also an output from a square waveform oscillator 21. The direction selecting quadruple pulse circuit 24 not only quadruples the sin-waveform and cos-waveform pulse signals but also selects the direction of movement. In the case where the sin-waveform output 22a has been input, ahead of the cos-waveform output 22b, into the direction selecting quadruple pulse circuit 24 as the output from said encoder 22, a quadruple pulse appears on a sin-waveform output terminal 24a according to the previously applied input waveform while, in the case where said cos-waveform output 22b has preceded, a quadruple pulse appears on a cos-waveform output terminal 24b. A polarity reversing circuit 25 receives the quadruple pulses from the output terminals 24a, 24b and receives a detection signal from a zero detector 29 so as to determine whether the resultant position is of a positive or negative polarity with respect to the movement standard 0 and thereupon to activate a polarity driver 33 which causes, in turn, a polarity display 34 to display + (plus) or − (minus). At the same time, the polarity reversing circuit 25 discriminates between an up count and a down count in accordance with the direction of movement and applies the pulse signal to a count pulse combining circuit 26. Count pulses from this count pulse combining circuit 26 are transferred to the up-down counter so that the amount of movement according to the direction of movement may be given by the numerical display. Thus, the numerical display constitutes the comparative display station according to the present invention, which can compare a numerical value display thereon with the numerical value appearing on the previously mentioned preset input display 32 and can generate a coincidence signal as a result of the comparison with the previously mentioned preset counter 35. With the embodiment illustrated, the signal from the said mode change-over switch 35 influences the output count from the count pulse combining circuit 26 so that, when the switch 38 has been changed over to the preset mode, the down count output is obtained. This output from the count pulse combining circuit 26 is applied to the up-down counter 30 as the down count which represents the movement of the movable body 2 in the preset direction of movement. The up-down counter 30 thus counts down as the movable body 2 moves, and the numerical display 32 will be correspondingly subtracted until the up-down counter 30 (I.e. numerical display 32) reaches 0, indicating that the movable body 2 has moved by the preset amount of movement. Thus, with this embodiment illustrated, the up-down counter 30 serving as the input display for the previously mentioned preset input station 35 and the numerical display 32 therefor directly constitute together the comparative display for the movement amount detector station. When the updown counter 30 reaches 0, the zero detector 29 applies the zero detection signal 29a as the coincidence signal to a solenoid drive circuit 36 of the electromagnetic brake assembly 30 and thereby energizes the solenoids 17 so that the push bars 18 urge the respective brake shoes 16 against the associated frame portions and the movable body 2 is arrested at the position corresponding to the preset amount of movement. Reference numeral 28 designates a reset switch closure which causes a reset pulse to be applied to the solenoid drive circuit 36 to deenergize the solenoids. Thus the braking effect is removed, and at the same time, the contents of the up-down counter 30 and the polarity reversing circuit 25 are cleared. As a result, the updown counter 30 now counts again the content of the preset counter 35. When the mode change-over switch 38 is changed over to the movement amount display mode, the count signal from the preset counter 35 to the up-down counter 30 is intercepted and now a count change-over signal is transmitted from the polarity reversing circuit 25 to the up-down counter 30 so that the count pulses are applied in the up or down count manner, depending on the direction of movement. The up-down counter 30 counts the amount of movement of the movable body 2 with respect to a predetermined standard position, such as the 0 position, and causes the numerical display 32 to display this count. Reference numeral 27 designates a manual brake switch of the electromagnetic brake assembly, which can selectively apply or deactivate the brakes. An alternative arrangement is also possible such that the manual brake switch 27 performs the function of applying the brakes, said reset switch 28 deactivating the brakes.

As will be understood from the aforegoing description, with the preset brake device in the line drawing machine, the drafting machine or the like, according to the present invention, it is possible to arrest the line drawing instrument or the scale at a preset position under the action of the electromagnetic brake assembly when a distance over which the line drawing instrument or scale is previously known and the amount of this movement has been input into the preset input station before the movement. This can completely eliminate the need for positioning the scale and reading the graduations, thereby extremely simplifying the operation of the line drawing machine, particularly in drawing lines at regular intervals.

The invention being thus described, it will be evident that the same may be varied in many ways. Such variations are not to be regarded as a departure from the spirit and scope of the invention, and all such modifications as would be obvious to one skilled in the art are intended to be included within the scope of the following claims.

What is claimed is:

1. A line drawing machine, comprising:

guide rail means disposed on said line drawing machine for guiding the movement of a line drawing instrument mounted thereon;

movable body means movable along said guide rail means for holding said line drawing instrument therein;

preset input station means disposed on said guide rail means for introducing a preset amount into said line drawing machine representing a desired amount of movement of said movable body means along said guide rail means and for generating an output signal representative of said desired amount of movement;

detector means disposed within said movable body means for detecting the amount of movement of said movable body means relative to said guide rail means and generating an output signal in response thereto;

means responsive to said output signals from said preset input station means and said detector means for determining when the amount of movement of said movable body means relative to said guide rail means is approximately equal to said preset amount introduced into said preset input station means and for generating a coincidence signal in response thereto; and electromagnetic brake assembly means disposed within said movable body means and responsive to said coincidence signal for arresting the movement of said movable body means relative to said guide rail means.

2. A line drawing machine in accordance with claim 1 wherein said preset input station means further comprises;

first display means for displaying said preset amount.

3. A line drawing machine in accordance with claim 2 wherein said detector means comprises up-down counter means for providing a count representative of the position of said movable body means along said guide rail means relative to a reference location on said guide rail means, said up-down counter means subtracting said count from said preset amount introduced into said preset input station means when said movable body means moves in one direction relative to said guide rail means, said coincidence signal being generated when said preset amount is reduced to zero in response to the movement of said movable body means in said one direction relative to said guide rail means, said electromagnetic brake assembly means arresting the movement of said movable body means along said guide rail means in response to said coincidence signal.

4. A line drawing machine in accordance with claim 3 further comprising:

second display means associated with said up-down counter means for digitally displaying the count of said updown counter means representing the position of said movable body means along said guide rail means;

whereby the position of said movable body means along said guide rail means may be visually compared with the preset amount entered via said preset input station means by comparing the display on said second display means with the display on said first display means, respectively.

5. A line drawing machine in accordance with claim 4 wherein said preset input station means further comprises mode change-over switch means for switching between a preset mode and a movement amount display mode, said up-down counter means subtracting said count from said preset amount introduced into said preset input station means when said change-over switch means is switched to said preset mode, said up-down counter means providing a count representative of the actual amount of movement of said movable body means relative to said guide rail means when said change-over switch means is switched to said movement amount display mode.

6. A line drawing machine in accordance with claim 5 further comprising:

reset switch means for cancelling said coincidence signal thereby deactivating said electromagnetic brake assembly means.

7. A line drawing machine in accordance with claim 6 wherein said reset switch means cancels the count of said updown counter means simultaneously with the cancelling of said coincidence signal and the deactivation of said brake assembly means.

8. A line drawing machine in accordance with claims 1 or 2 wherein said detector means further comprises:

a linear scale fixed to said guide rail means and having scale graduations disposed thereon;

photoelectric detector means mounted on said movable body for detecting the scale graduations on said linear scale and generating outut signals in response thereto; and up-down counter means responsive to said output signals from said photoelectric detector means for providing a count representative of the position of said movable body means along said guide rail means.

9. A line drawing machine in accordance with claims 1, 2, 3, 4, 5, 6, or 7 wherein said electromagnetic brake assembly means is mounted on said movable body means; and wherein said brake assembly means includes, solenoid means, and brake shoe means in said solenoid means, said solenoid means urging said brake shoe means against said guide rail means in response to energization thereof.

* * * * *